INVENTOR
CLAYTON A. WASHBURN
BY John A. Harvey
ATTORNEY

CONTROL WAVEFORM SWITCHING

PHASE REFERENCE PULSE GENERATOR, BLANKING PULSE GENERATOR, AND SWITCH PULSE GENERATOR.

Feb. 24, 1970 C. A. WASHBURN 3,497,758

ERROR CORRECTION SYSTEM FOR CATHODE-RAY TUBE INFORMATION DISPLAY

Original Filed Aug. 10, 1964 9 Sheets-Sheet 4

VELOCITY MOD. DEFLECTION GEN. & ADDER

AUTOMATIC POSITION ERROR CORRECTION SYSTEM

HORIZONTAL AFC CIRCUIT WITH ERROR POSITION PHASE CONTROL

CRT SCREEN-EDGE DETAILS

Feb. 24, 1970 C. A. WASHBURN 3,497,758

ERROR CORRECTION SYSTEM FOR CATHODE-RAY TUBE INFORMATION DISPLAY

Original Filed Aug. 10, 1964 9 Sheets-Sheet 7

HORIZONTAL DEFLECTION & HV ANODE SUPPLY

ERROR CORRECTION SYSTEM FOR CATHODE-RAY TUBE INFORMATION DISPLAY 3,497,758

ERROR CORRECTION SYSTEM FOR CATHODE-RAY TUBE INFORMATION DISPLAY

Clayton A. Washburn, 24 Andrea Lane, Thornwood, N.Y. 10594

Original application Aug. 10, 1964, Ser. No. 389,824, now Patent No. 3,312,779, dated Apr. 4, 1967. Divided and this application Nov. 7, 1966, Ser. No. 592,625
Int. Cl. H01j 31/48, 29/70
U.S. Cl. 315—11 26 Claims

ABSTRACT OF THE DISCLOSURE

An error correction system for a cathode-ray tube display arrangement which provides essentially instantaneous and automatic corrective control of the beam positioning at each of preselected intervals during a beam traversal of the display area of the cathode-ray tube.

The present application is a division of applicant's copending application Ser. No. 389,824, now Patent No. 3,312,779, filed Aug. 10, 1964, entitled Color Television Image Reproduction System which in turn is a continuation-in-part of application Ser. No. 358,700, now abandoned, filed Apr. 10, 1964, of the same title.

The present invention relates to cathode-ray tube scan error correction systems. While the invention has utility in numerous diverse applications, it will be disclosed and described by way of example as utilized in a system for displaying video images.

It is an object of the present invention to provide, for a cathode-ray tube display arrangement, a new and improved error correction system which provides essentially instantaneous and automatic corrective control of cathode-ray beam positioning at each of preselected intervals during a beam traversal of the display area of the cathode-ray tube.

It is a further object of the invention to provide a novel error correction system for a cathode-ray tube display arrangement and one which effects automatic correction of cathode-ray beam positioning by halting the normal beam scanning motion during each of preselected brief error corrective intervals and at preselected minimized-area halt positions on the face of the cathode-ray tube.

It is an additional object of the invention to provide an error correction system which operates independently of information to be displayed by a cathode-ray tube and provides during reproduction of the displayed information rapid and automatic corrective control of cathode-ray beam positioning in respect preselected reference index positions on the face of the cathode-ray tube.

It is yet a further object of the invention to provide an improved error correction system for a cathode-ray tube display arrangement and one wherein error corrective control is established by an electrical nulling arrangement responsive solely to the prevailing position of the cathode-ray beam in relation to each of plural preselected reference index positions on the face of the tube and at the end of each of plural reference time intervals, thereby to ensure precise controlled positioning of the beam during its scan motion.

It is an additional object of the invention to provide for a cathode-ray tube display arrangement an error correction system wherein an error corrective electrical signal is produced and utilized both to effect essentially instantaneous and automatic correction of beam position at preselected index positions and at preselected index time intervals during each beam traversal of the display area of the tube and also to effect at a slower response rate reduction of certain errors which are otherwise inherently introduced into the prevailing rate of beam scan by such factors as the physical geometry of the cathode-ray tube construction and the design, adjustment and operation of beam deflection and deflection synchronizing circuits as these influence the prevailing position of the beam at any given time in traversing the display area of the cathode-ray tube.

Other and further advantages of the invention will appear as the detailed description thereof proceeds in the light of the drawings forming a part of this application, and in which.

Figure 1:
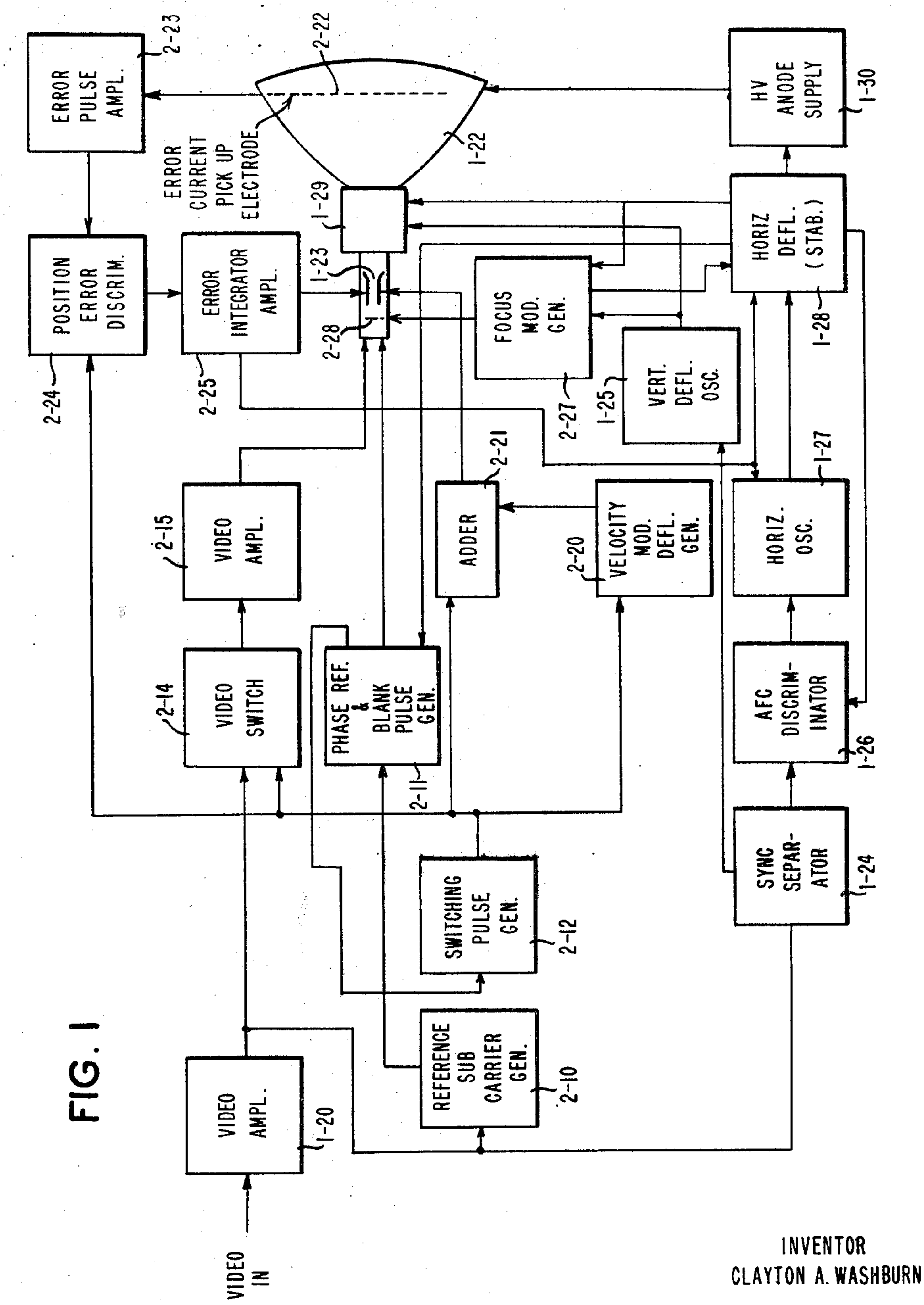
FIG. 1 represents in block diagram the construction of a video image reproduction arrangement embodying the error correction system of the present invention in a particular form.

The error control system of the present invention is herein described by way of example as embodied in a monochrome video image reproduction arrangement having, as shown in FIG. 1, a video amplifier 1–20 to which a video signal is applied and a cathode-ray tube 1–22 to which the amplified video signal is supplied for image reproduction. The input monochrome signal is conventional in that it includes video signal components combined with horizontal and vertical synchronizing signal components, but differs from a conventional monochrome signal in that it also includes a burst synchronizing signal component of approximately 3.58 megacycles placed on the rear portion of each horizontal synchronizing-pulse pedestal as in a conventional color television video signal. This burst synchronizing signal component is used by the error control system in a manner presently to be explained.

The amplified video signal translated by the amplifier 1–20 is supplied to a synchronizing-signal-component separator 1–24 where the vertical and horizontal synchronizing pulse signals are separated in conventional manner from the video signal components and from each other. The separated vertical synchronizing signal pulses are supplied to synchronize, in conventional manner, the operation of a vertical deflection oscillator 1–25 while the separated horizontal synchronizing signal pulses are supplied to an automatic frequency control (AFC) discriminator 1–26 which uses them in conventional manner to synchronize the operation of a horizontal oscillator

1–27. The latter generates and supplies to a horizontal deflection amplifier 1–28 a conventional amplifier drive signal voltage of composite sawtooth and pulse waveform. The amplified signal output current of the amplifier 1–28 is stabilized by the error correction system of the invention in a manner hereinafter explained and energizes a horizontal deflection winding of a conventional deflection yoke 1–29 repetitively to deflect the cathode-ray beam of the tube 1–22 horizontally at the horizontal scanning frequency and at conventional trace and retrace velocities. The output current of the vertical deflection oscillator 1–25 energizes a vertical deflection winding of the yoke 1–29 repetitively to deflect the cathode-ray beam of the tube 1–22 vertically at the vertical scanning frequency and at conventional trace and retrace velocities. These horizontal and vertical deflections cause the cathode-ray beam to trace conventional interlaced rasters of horizontal scanning lines on the fluorescent screen of the cathode-ray tube 1–22 when the latter is energized in conventional manner including anode energization by high voltage supplied by a conventional high voltage supply system 1–30 conventionally energized by the horizontal deflection amplifier 1–28.

As the cathode-ray beam traces the interlaced rasters of horizontal scanning lines last mentioned, the beam intensity is modulated by supplying the amplified video signal of the amplifier 1–20 through a video switch unit 2–14 (having a function presently to be described) and through a video amplifier 2–15 to a conventional modulation control electrode of the tube 1–22 thus to reproduce a video image on the fluorescent screen of the latter in conventional manner.

During image reproduction, the error control system of the invention operates to ensure exceptionally high linearity of horizontal cathode-ray beam scan by essentially instantaneous and automatic correction control of the beam positioning at each of plural reference index scan positions and at each of plural reference time intervals during each beam traversal in horizontal direction across the fluorescent screen of the cathode-ray tube 1–22.

The error control system includes a reference subcarrier generator 2–10 which is of conventional construction and which is synchronized in operation by the burst synchronizing signal component of the amplified video signal translated by the video amplifier 1–20. The generator 2–10 generates and supplies to a reference-phase and blanking-pulse generator unit 2–11 a subcarrier signal of nominal frequency of 3.58 megacycles (actual 3.579545 megacycles for a video monochrome signal conforming to Federal Communication Commission specifications). The unit 2–11 utilizes this subcarrier signal to generate short-duration reference-phase potential pulses at a periodicity twice that of the subcarrier signal. These reference-phase pulses are supplied as cathode-ray beam extinction or blanking pulses, together with line-retrace blanking pulses supplied from the horizontal deflection amplifier 1–28 to the unit 2–11, to the cathode electrode of the cathode-ray image display tube 1–22. The phase reference pulses generated by the unit 2–11 are also supplied to a switching pulse generating unit 2–12, which for the particular error correction system hereinafter described by way of example, generates switching pulses of rectangular waveform and having a periodicity one-quarter that of the subcarrier signal generated by the unit 2–10. These switching pulses are supplied to the video switch unit 2–14 for a purpose presently to be explained, and are also supplied to a velocity modulation deflection generator 2–20. The latter operates under time control of the switching pulses generated by the unit 2–12 to generate at the switching pulse frequency a minor deflection signal of saw-tooth plus step waveform. The signal generated by the generator 2–20 is translated through an adder 2–21, wherein a component of the switching pulse voltage generated by the generator 2–12 is added thereto, to horizontal-scan deflection electrodes 1–23 of the tube 1–22 as a cathode-ray beam deflection control signal which is effective to control the horizontal motion of the cathode-ray beam. In particular, the minor saw-tooth deflection signal has such polarity as applied to the deflecting electrodes 1–23 as to effect a reverse direction of horizontal beam scan during each switching pulse interval. The amplitude of the minor deflection signal is selected to produce a reverse amount of horizontal beam scan which just equals the amount of the forward horizontal beam scan produced by the magnetic field of the horizontal winding of the scanning yoke 1–29 so that the beam is halted during each switching pulse interval. It is during each such halt of the beam that error control beam positioning takes place in a manner presently to be described more fully. The forward scanning displacement lost during each such halt of the beam is made up between switching pulses by the positive slope and step portions of the minor deflection signal which incrementally increase the forward beam scan velocity and displacement over that otherwise produced by the magnetic field of the horizontal winding of the scanning yoke 1–29 so that the overall length of a line trace is the same as that which would prevail had the beam not been so halted.

For error control system horizontal correction positioning of the cathode-ray beam as it traverses the fluorescent screen of the tube 1–22 an array of vertically oriented and horizontally spaced secondary emission stripes is fabricated on the rear surface of the fluorescent screen of the picture tube 1–22 and a conductive grid structure 2–22 is fixedly supported within the tube 1–22 in spaced relation to the rear surface of the fluorescent screen. The grid structure 2–22 supplies an error correction pulse signal through an error pulse amplifier 2–23 to a position error discriminator 2–24 which, operates under control of the switching pulses generated by the unit 2–12. The discriminator 2–24 develops an output beam-position error pulse signal which is integrated by an error integrating amplifier 2–25 to develop and apply to the deflecting electrodes 1–23 an automatic error correction potential which deflects the beam from each secondary emissive stripe to an adjacent non-emissive reference position. This error correction operation is accomplished periodically during the horizontal scan of the cathode-ray beam and under controlled conditions established by the switching pulses of the generator 2–12. These controlled conditions are such that at the beginning of each switching pulse interval the beam is abruptly displaced from its prevailing scan position approaching a secondary emissive stripe onto such stripe where the beam scanning motion is halted by the minor deflection signal supplied from the velocity modulation generator 2–20 to the deflection electrodes 1–23, and the video switch 2–14 temporarily halts translation of the video signal from the video amplifier 1–20 and temporarily effects translation of a standard reference brightness signal. Thus an error correction positioning of the horizontally scanning cathode-ray beam is periodically effected under pre-established standardized conditions to maintain correct displacement of the beam in relation to the vertically oriented lagging edges of successive ones of the secondary emissive stripes which are provided under the fluorescent screen of the tube 1–22. At the end of each such correction interval, the beam is displaced forwardly from the error correction position onto the fluorescent screen by a step component of the minor deflection waveform and thereupon resumes its forward scan.

During each horizontal retrace cycle, the deflection error correction system continues to be operative in a manner similar to that just described for each line trace interval. However, the horizontal synchronizing pulses of the video signal cause the cathode-ray beam to be extinguished or blanked for an interval corresponding to the order of seven or eight switching pulses and this results in an error in the correction information which tends to deflect the cathode-ray beam much too far to the left for correct positioning to begin a new horizontal trace. In order to make up for this retrace error and assure that the cathode-ray beam position is corrected by the time video unblanking occurs, the picture tube 1–22 is provided on the rear surface of its face plate with secondary emissive wide stripes at both the left- and right-hand edges of the image reproduction area. This construction will be explained more fully hereinafter, but it may be noted at this time that there are typically one or two switching pulses after video blanking but before retrace starts and there are two or three switching pulses which occur at the end of the retrace but before video unblanking occurs. Extra wide secondary emissive stripes positioned at the left and right sides of the image reproduction area assure that the cathode-ray beam dwells on at least one such strip until the retrace error is corrected. Since the beam retraces from the right to the left side of the image area as viewed from the front of the cathode-ray tube, the right-hand edges of the secondary emissive stripes (preferably being three in number) on the left side of the image reproduction area are positioned to provide correct beam referencing position; that is, the beam normally finishes its retrace too far to the left to begin a new retrace motion and the wide stripes at the left-hand margin of the image area provide relatively large amplitude and prolonged duration correction deflection pulses needed rapidly to shift the beam deflection to the correct position at which it just moves off of the right edge of the secondary emissive stripe adjacent the image area.

The blanking pulses generated by the unit 2–11 and supplied to the cathode electrode of the picture tube 1–22 serve to extinguish the cathode-ray beam of the picture tube at the beginning and end of each switching pulse interval and during the horizontal retrace interval to avoid reproduction by the picture tube of any transient conditions arising from the periodic error correction operations last described.

Since the cathode-ray beam of the picture tube 1–22 is deflected by the deflection yoke 1–29 through vertical and horizontal angles convering to a point in the deflection yoke 1–29, and since the fluorescent screen of the picture tube is formed on a generally spherical face plate surface of larger radius, the focus of the cathode-ray beam to a fine spot at the center of the fluorescent screen generally should be modified to maintain the beam sharply focused at the horizontal and vertical edges of the fluorescent screen. This focus modification is accomplished by a focus modulation generator 2–27 which receives vertical and horizontal deflection potentials developed across the respective vertical and horizontal windings of the deflection yoke 1–29, converts these potentials to a periodic potential having combined parabolic waveform at both the vertical and horizontal scanning frequencies, and supplies this focus modification potential to a focus electrode 2–28 provided in the picture tube 1–22.

Figure 2:
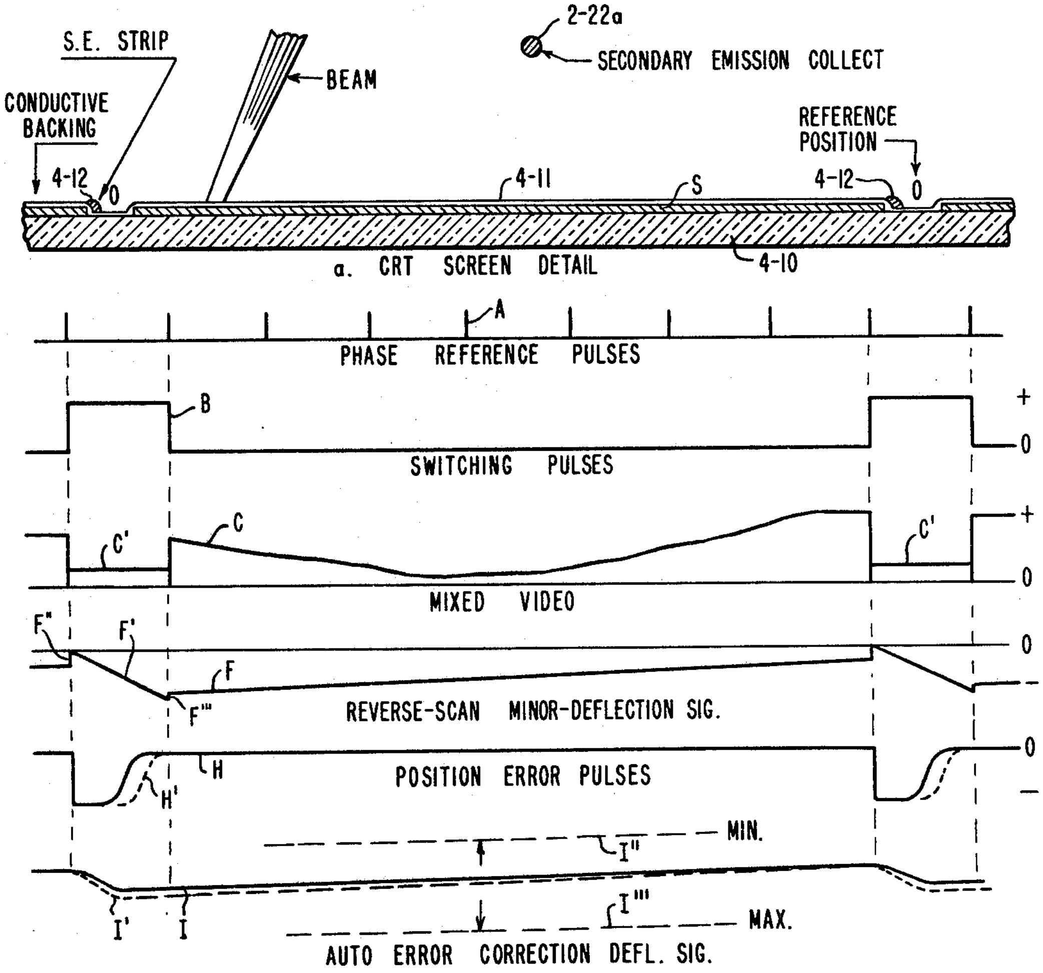
FIG. 2 shows a fragmentary cross-sectional view illustrating a cathode-ray tube fluorescent screen construction utilized in the FIG. 1 embodiment of the invention and the waveforms of time-displacement related voltages developed at selected points in the FIG. 1 arrangement.

In further considering the operation of the FIG. 1 arrangement, reference is made to FIG. 2 and particularly to FIG. 2*a* which illustrates a horizontal cross-sectional view of a small portion of the cathode-ray tube fluorescent screen S placed upon the inner surface of the glass face plate 4–10 of the tube. An aluminized coating 4–11 is preferably formed in conventional manner on the rear surface of the fluorescent screen for improved image contrast and brilliance. It was earlier mentioned that vertically oriented secondary emissive scan error-correction stripes were fabricated with uniform horizontal spacings on the rear surface of the fluorescent screen S. In practice, these secondary emissive stripes 4–12 are fabricated on the rear surface of the aluminized coating 4–11 and are shown by way of example as spaced by a distance equal to that scanned by the cathode-ray beam scanning at constant velocity (without error correction halt) during four cycles of the reference subcarrier signal generated by the generator 2–10. In practice, the fluorescent screen S preferably terminates just to the right (as seen in FIG. 2) of each secondary emissive stripe 4–12 as shown to permit insertion in the screen format of a zero reference position (used for beam positioning error correction presently to be described) of small width within the leading one-third portion of which a secondary emissive stripe 4–12 is located leaving a remaining zero reference position portion which is treated to minimize secondary emission. This zero reference position is devoid of phosphor as shown and thus does not produce light output when the cathode-ray beam dwells for a slight interval at the reference position, but the width of the reference position is so small that the absence of light output at the reference position is not discernable. FIG. 2*a* also shows one conductor **2–22*a* of the secondary emission collector grid structure 2–22** which is provided in the picture tube and supported in proximate spaced relation, by means not shown, to the fluorescent screen.

The phase reference potential pulses generated by the unit 2–11 are represented by curve A of FIG. 2 and, as earlier mentioned, have a periodicity twice that of the subcarrier signal generated by the generator 2–10. These phase reference pulses are supplied to the switching pulse generator 2–12 to produce switching pulses, represented by curve B, which have a periodicity one-quarter that of the subcarrier signal generated by the generator 2–10.

These switching pulses so control the video switch unit 2–14 as to permit the translation by this unit of the video signal, represented by curve C of FIG. 2, during the intervals between switching pulses but cause the video switch unit 2–14 to translate during each switching pulse interval a standard reference-amplitude brightness signal represented by the uniform amplitude portion C′ of curve C.

The switching pulses of the pulse generator 2–12 so controls the velocity modulation deflection generator 2–20 as to cause this unit to generate during each switching pulse a saw-tooth reverse-scan minor deflection signal component, represented by the linear curve portion F′ in FIG. 2 and additionally to generate during the interval between switching pulses a forward-scan deflection signal component represented by the linear curve portion F in FIG. 2.

The scan error correction units 2–23 to 2–25 maintain automatic correction of the cathode-ray beam positioning as the beam moves across the fluorescent screen in timed relation to successive subcarrier cycles, thus insuring an exceptionally high degree of scan linearity (i.e. uniform length of line trace per unit of time) throughout a scanned line. To this end, the horizontal line scan amplitude has a value selected slightly less than normal so that the beam tends to lag very slightly behind its correct positioning as indicated by the projection of the phase reference pulses of curve A of FIG. 2 onto the fluorescent screen illustrated in FIG. 2*a*. Upon the occurrence of each switching pulse represented by curve B of FIG. 2, the cathode-ray beam current is established at a reference value represented by the portion C′ of curve C. The step component F″ of the minor deflection signal of FIG. 2 immediately effects movement of the cathode-ray beam positioning onto a secondary emissive stripe 4–12, and the saw-tooth reverse-scan signal represented by linear curve portion F′ of FIG. 2 halts scanning motion of the cathode-ray beam to maintain it positioned on the secondary emissive stripe 4–12. The resultant secondary emission from the secondary emissive stripe 4–12 is collected by the collector grid structure 2–22 of the picture tube to develop and apply to the error pulse amplifier 2–23 a correction potential pulse represented by curve H of FIG. 2. This pulse is applied to the discriminator 2–24 to produce an error correction potential change represented by curve I of FIG. 2 having an amplitude of change varying with the width of the error correction pulse represented by curve H. This error correction potential change is amplified by the amplifier 2–25 and is applied to the deflection electrodes 1–23 to move the cathode-ray beam forward toward the zero reference position of the fluorescent screen. As the beam moves onto the reference position, it moves off of the secondary emissive stripe 4–12 so that the production of secondary emission is reduced and the error correction pulse terminates. Thus if the beam position lags unduly, secondary emission from the secondary emissive stripe 4–12 occurs during a longer interval to produce an error correction pulse of wider width as represented by the broken-line portion H′ of curve H and this in turn produces an error correction potential change of larger amplitude as represented by the broken-line curve I′ of FIG. 2 to effect a greater forward displacement of the cathode-ray beam sufficient to insure its movement into the zero reference position of the fluorescent screen during the interval of a switching pulse. Accordingly, the termination of each switching pulse finds the cathode-ray beam correctly located at the zero reference position, and the step component F‴ of the minor deflection signal of FIG. 2 advances the beam onto the phosphor S in readiness to begin its continued forward scanning motion toward the next reference position at which a similar position corrective operation will take place.

It may be noted in respect to this error corrective operation that, as earlier mentioned, a similar corrective positioning of the beam takes place following the line retrace interval to leave the beam positioned just off the inner or right-hand edge of a broad secondary emissive stripe located just to the left of the image reproduction area of the cathode-ray tube (as viewed from the front of the tube). The magnitude of this error correction potential over a line scan interval reflects, on a cumulative basis, deviations of the horizontal scan amplitude and phase from normal. Thus if the phase is normal but the scan amplitude is excessive, the amplitude of the error correction potential has a finite value at the initiation of line scan and cumulatively decreases with subsequent repetitive error corrections as the beam moves to the center of the image area and thereafter cumulatively increases by repetitive error corrections made as the beam moves from the center of the image area to the right-hand margin thereof. Retarded phase of horizontal scan tends cumulatively to increase the error signal amplitude throughout the line scanning interval. The range of error correction potential change throughout a line interval is indicated by the minimum-amplitude and maximum-amplitude broken lines I″ and I‴ associated with curve I in FIG. 2. It will be evident from the foregoing description of the line-interval deflection error correction operation that the waveform of the error correction voltage during a line scanning interval provides a continuous plot of the errors in the major deflection system including amplitude and centering or phasing errors as well as deflection non-linearities. The error correction minimizes the linearity requirements on the horizontal scanning system, yet at the same time enables use of the linearity correction potential for automatic adjustment of the amplitude and phase of the horizontal deflection system to maintain them within the range of correction capability of the error correction system as will hereinafter be explained more fully in the detailed description of the horizontal scanning units 1–26 to 1–28.

The detailed construction and operation of those component units in FIG. 1 which are not conventional will now be considered beginning with the phase reference and blanking pulse generator unit 2–11 and the switching pulse generator 2–12.

REFERENCE PHASE AND BLANKING PULSE GENERATOR 2–11 AND SWITCH PULSE GENERATOR 2–12

Figure 3:
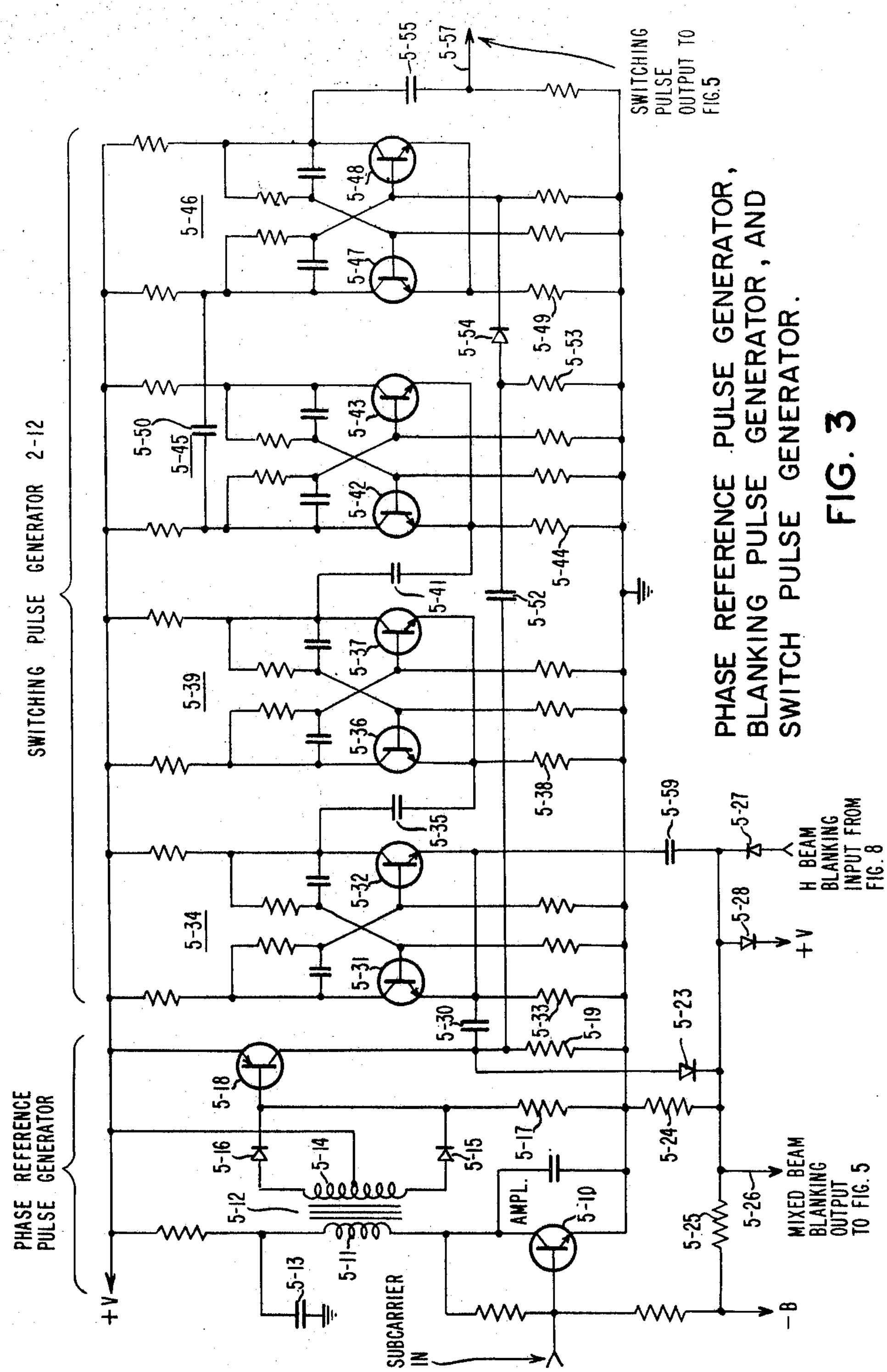
FIG. 3 shows the circuit arrangement of several generators used in the FIG. 1 system.

The circuit arrangement of the phase reference pulse generator, the blanking pulse generator, and the switching pulse generator is shown in FIG. 3.

It includes a transistor amplifier 5–10 of conventional construction and to which the output reference subcarrier of the generator 2–10 of FIG. 1 is supplied for amplification. The primary winding 5–11 of a transformer 5–12 is included in the collector circuit of the transistor amplifier 5–10 and is tuned by a condenser 5–13 to resonance at the subcarrier frequency so that sinusoidal subcarrier oscillations are developed across the transformer primary winding 5–11. Sinusoidal subcarrier oscillations are accordingly developed in the center-tapped secondary winding 5–14 of the transformer 5–12 and are full-wave rectified by diode rectifiers 5–15 and 5–16 to develop across a resistor 5–17 a voltage of full-wave rectification waveform and having a periodicity twice that of the subcarrier oscillations. This voltage of full-wave rectification waveform is applied to the base electrode of a conventional transistor amplifier 5–18 which includes the resistor 5–17 in its base bias circuit, and the polarity of the voltage is such that the amplifier 5–18 is non-conductive except for the very short intervals when the full-wave rectification voltage is near its zero voltage value. There is thus developed across the collector load resistor 5–19 of the amplifier 5–18 phase reference pulses of brief pulse duration and having a periodicity twice that of the reference subcarrier signal.

The phase reference potential pulses developed across the load resistor 5–19 are supplied through a diode rectifier 5–23 to a resistive potential divider comprised by series resistors 5–24 and 5–25 which reduces the amplitude of the pulses and supplies them to a blanking pulse output circuit 5–26. Horizontal retrace pulses from the horizontal amplifier 1–28, described more fully hereinafter, are supplied through a diode rectifier 5–27 to an amplitude limiting diode rectifier 5–28 having its cathode biased by a source of positive potential as shown to establish a preselected amplitude limiting level. The horizontal retrace pulses thus limited in amplitude to provide retrace blanking pulses are also supplied to the blanking pulse output circuit 5–26.

The phase reference pulses developed across the load resistor 5–19 are also coupled through a condenser 5–30 to the common emitter electrodes of a pair of transistors 5–31 and 5–32 which have base and collector electrodes cross-coupled to provide a conventional bistable multivibrator utilizing a common cathode coupling resistor 5–33 and providing a first pulse-periodicity divider stage 5–34. Potential pulses developed in the collector electrode circuit of the transistor 5–32 are coupled through a condenser 5–35 to the common emitter electrodes of a pair of transistors 5–36 and 5–37 likewise having base and collector electrodes cross-coupled to provide a conventional bistable multivibrator using a common cathode coupled resistor 5–38 and providing a second pulse-periodicity divider stage 5–39. Potential pulses developed in the collector circuit of the transistor 5–37 are coupled through a condenser 5–41 to the common emitter electrodes of a pair of transistors 5–42 and 5–43 having base and collector electrodes cross-coupled to provide a conventional bistable multivibrator utilizing a common cathode coupling resistor 5–44 and providing a third pulse-periodicity divider stage 5–45. A fourth bistable multivibrator 5–46 likewise includes a pair of transistors 5–47 and 5–48 having emitter electrodes connected together and utilizing a common cathode coupling resistor 5–49 and having base and emitter electrodes cross-coupled to provide a conventional bistable multivibrator. Negative potential pulses developed in the collector circuit of the transistor 5–42 are coupled through a condenser 5–50 to the collector electrode of a transistor 5–47 to render the latter conductive when the transistor 5–42 becomes conductive. Phase reference pulses developed across the load resistor 5–19 are coupled through a series condenser 5–52 to a shunt resistor 5–53, and phase reference pulses developed across the latter are supplied through a diode rectifier 5–54 to the base electrode of the transistor 5–48 to render the latter conductive one phase reference pulse interval after it has been rendered non-conductive by multivibrator operation. Potential pulses developed in the collector electrode circuit of the transistor 5–48 are coupled through a condenser 5–55 to a switching pulse output circuit 5–57 which, as earlier explained, extends to a number of component units to control their operations.

In considering the operation of the FIG. 3 arrangement, it will be apparent that a phase reference pulse is developed at the zero and 180 cyclic reference points of the reference subcarrier generated in the output circuit of the generator 2–10, so that the phase reference pulses have a periodicity twice that of the reference subcarrier signal. The out potential pulses of the first divider stage 5–34 have a periodicity one-half that of the phase reference pulses; the output pulses of the second divider stage 5–39 have a periodicity one-quarter that of the phase reference pulses; the output pulses of the third frequency divider stage 5–45 have a periodicity one-eighth that of the phase reference pulses. The conductive state of the transistor 5–42 of the third divider stage 5–45 causes the transistor 5–47 of the fourth divider stage 5–46 to be rendered also conductive but the next phase reference pulse renders the transistor 5–48 conductive. Thus the switching pulses developed in the collector circuit of the transistor 5–48 and supplied to the output circuit 5–57 have a pulse duration equal to the interval between the phase reference pulses and a pulse periodicity equal to one-eighth that of the phase reference pulses.

Under present television standards, the reference subcarrier frequency is related to the horizontal line scanning frequency by a factor of 227½ which is equal to 445/2. Therefore, the phase reference pulses have a periodicity equal to 455 times the horizontal line scanning perodicity whereas the switching pulses have a perodicity $$455/8=567/8$$

times the horizontal scanning frequency. In order to provide an even number of error samples during each horizontal scanning line as is required by the vertically oriented secondary emissive error sampling stripes earlier described in connection with FIG. 2, it is necessary that the sampling rate be a whole integer. To this end, and as shown in FIG. 3, the horizontal blanking pulses developed across the diode rectifier 5–28 are coupled through a condenser 5–59 to the emitter electrodes of the transistors 5–31 and 5–32 to provide an additional count upon each line retrace. This additional count causes the generation of 456/8=57 switching pulses during each complete line trace interval.

THE VELOCITY MODULATION DEFLECTION GENERATOR 2–20 AND ADDER 2–21

Figure 4:
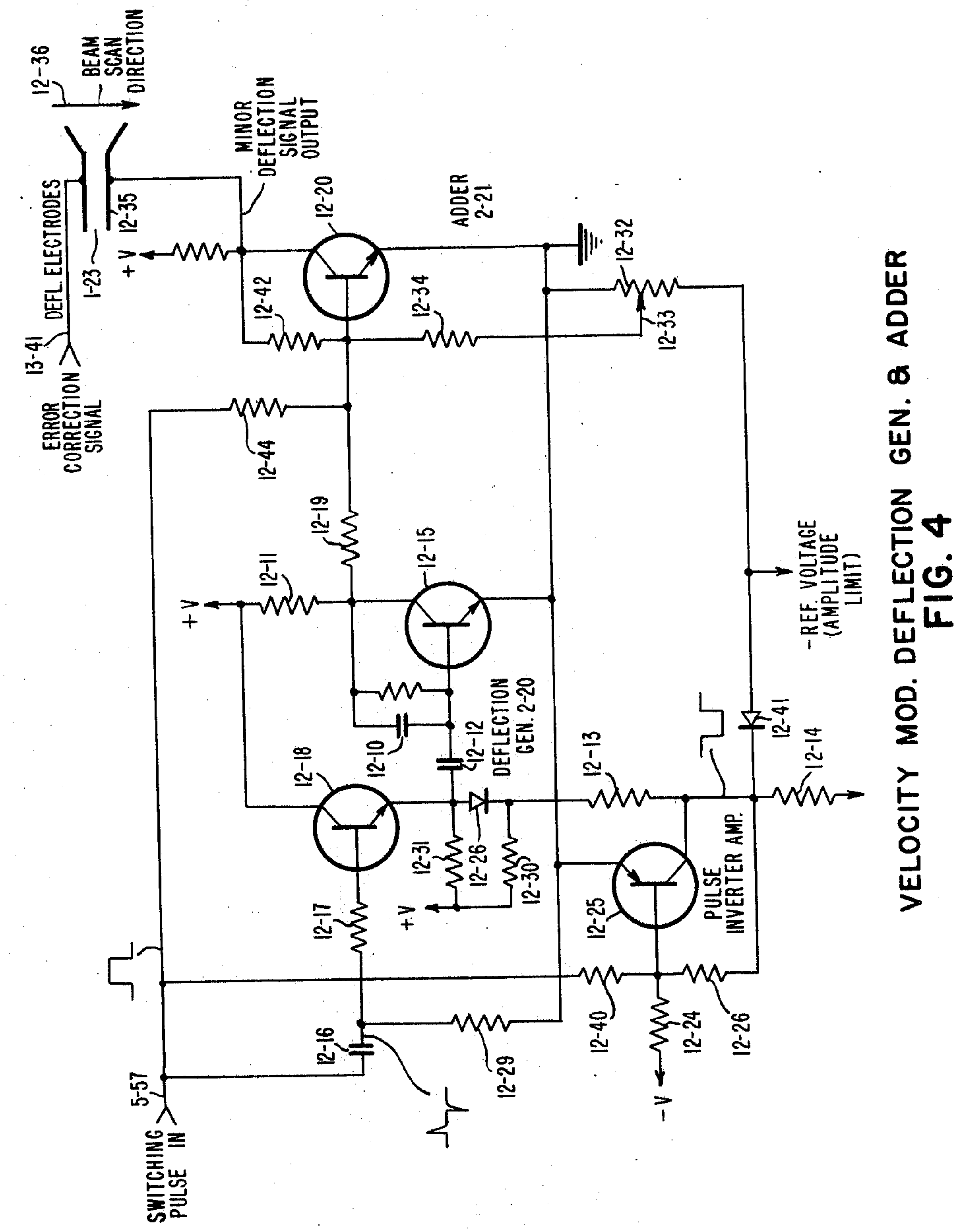
FIG. 4 is the circuit diagram of a velocity modulation deflection signal generator and an adder used in the FIG. 1 embodiment of the invention.

The construction of these component units is shown in FIG. 4. The velocity modulation deflection signal generator 2–20 includes a condenser 12–10 which is charged during each switching pulse and is discharged between the switching pulses in a manner presently to be explained. The charging circuit for this condenser extends from a source of potential +V through a series resistor 12–11, a coupling condenser 12–12 of relatively large capacitance, a diode rectifier 12–26, a resistor 12–13, and a resistor 12–14 to the negative terminal −V of the potential source. As the condenser 12–10 charges to provide a reverse scan saw-tooth potential component across this condenser in a manner which will become more apparent hereinafter, an increasingly larger negative potential is applied to the base electrode of a transistor amplifier 12–15 to develop an increasingly larger positive potential in the collector electrode circuit of this transistor. Switching pulses generated by the generator 2–12 described in connection with FIG. 3 are supplied from the output circuit 5–57 of the latter through a short-time-constant differentiating circuit comprised by a coupling condenser 12–16 and a resistor 12–29 to derive and supply through a series resistor 12–17 to the base electrode of a transistor 12–18 positive polarity differentiation pulses as shown. The transducer 12–18 has a collector electrode energized from the positive terminal of the potential source +V and has an emitter electrode connected to the juncture of the coupling condenser 12–12 and the diode rectifier 12–26. Each positive polarity differentiation pulse developed by the leading edge of each switching pulse and applied to the base electrode of the transistor 12–18 causes the latter to become highly conductive and this conductive state quickly charges the condenser 12–10 in a direction to make the base electrode of the transistor 12–15 more positive and to a potential which establishes the zero reference potential of the output minor deflection signal, and thereby to generate a step component of the latter signal equal to the sum of the step components F″ and F‴ of FIG. 2.

A bias current −V is supplied through a series resistor 12–24 to the base electrode of a transistor 12–25 normally to maintain the latter fully conductive. The transistor 12–25 has its collector electrode energized through the resistor 12–14 and its base and collector electrodes are coupled through a feed-back resistor 12–26. The normally prevailing fully conductive state of the transistor 12–25 causes its collector electrode to be at essentially ground potential. For this condition, the resistor 12–13 and a resistor 12–30 bias the diode rectifier 12–26 to a non-conductive state. During each cathode-ray beam position error correction operation, switching pulses generated by the switching pulse generator 2–12 are applied with positive polarity from the output circuit 5–57 of the latter through a resistor 12–40 to the base electrode of the transistor 12–25 to reduce the conductivity of the latter. This causes the collector voltage of the transistor 12–25 to increase in a negative direction until halted by a diode rectifier 12–41 having its anode electrode connected to a source of negative reference voltage as shown. A maximum amplitude saw-tooth charge potential is thereupon developed across the condenser 12–10, through the charging circuit earlier described, during the switching pulse interval to provide during each switching pulse a reverse-scan deflection signal component F′ (FIG. 2). At the termination of a switching pulse, the transistor 12–25 becomes once more fully conductive to render the diode rectifier 12–26 non-conductive. The charged condenser 12–10 now discharges slowly through a resistor 12–31 which effectively connects the lower terminal of the condenser 12–10 to the positive potential source +V as shown, the discharge of the condenser 12–10 progressing to the next switching pulse and thus producing the forward-scan component F (FIG. 2) of the minor deflection signal.

The charge and discharge voltage of the condenser 12–10 is amplified and reversed in polarity by the transistor 12–15, and is supplied through a resistor 12–19 to a transistor 12–20 (comprising the adder 2–21) where it is added to a component of the switching pulses supplied through a resistor 12–44. The transistor 12–20 has a selectable value of operating bias applied to its base electrode by a potential divider comprised by series-connected resistors 12–42, 12–34, and a potentiometer 12–32, 12–33 as shown. The combined charge-discharge potential and switching pulse component are amplified and reversed in polarity by the transistor 12–20 to develop in the collector output circuit of the latter the minor deflection signal shown in FIG. 2. This minor deflection signal is supplied to a deflecting electrode 12–35 of the electrode pair 1–23. The forward beam scanning motion during the interval between switching pulses is in the direction shown by the arrow 12–36. The amplitude value of the switching pulse component supplied to the base electrode of the transistor 12–20 modifies the amplitude of the step component of the charge-discharge potential also supplied to the base electrode of the latter to provide resultant forward step components of the minor deflection signal at the beginning and end of each error correction interval and represented by the respective step component F″ and F‴ in FIG. 2. The initial step component F″ of the minor deflection signal applied to the deflection electrode 12–35 effects an initial rapid forward displacement of the beam in the direction 12–36 to move the beam from the fluorescent screen S (FIG. 2) onto the adjacent emissive stripe 4–12. The terminal step component F‴ of the minor deflection signal effects a subsequent rapid forward displacement of the beam in the direction 12–36 from its error corrected location, at the zero reference position, onto the fluorescent screen S. Between each such initial and subsequent rapid forward displacement of the beam, the reverse scan component F′ of the minor deflection signal halts the forward displacement beam motion to permit an error positional correction movement of the beam from the emissive stripe 4–12 to a preselected index position thereof where the beam is halted in the zero reference position just off of the lagging edge of the emissive stripe as earlier explained. During the interval between switching pulses, the forward-scan component F (FIG. 2) of the minor deflection signal incrementally increases the forward beam scan velocity over that otherwise produced by the magnetic field of the horizontal winding of the scanning yoke 1–29 (FIG. 1) to compensate the forward scanning displacement lost during each such error corrective halt of the beam as earlier mentioned.

THE ERROR CORRECTION SYSTEM INCLUDING VIDEO SWITCH AMPLIFIER 2–14, THE ERROR PULSE AMPLIFIER 2–23, THE POSITION ERROR DISCRIMINATOR 2–24 AND THE ERROR INTEGRATOR AMPLIFIER 2–25

Figure 5:
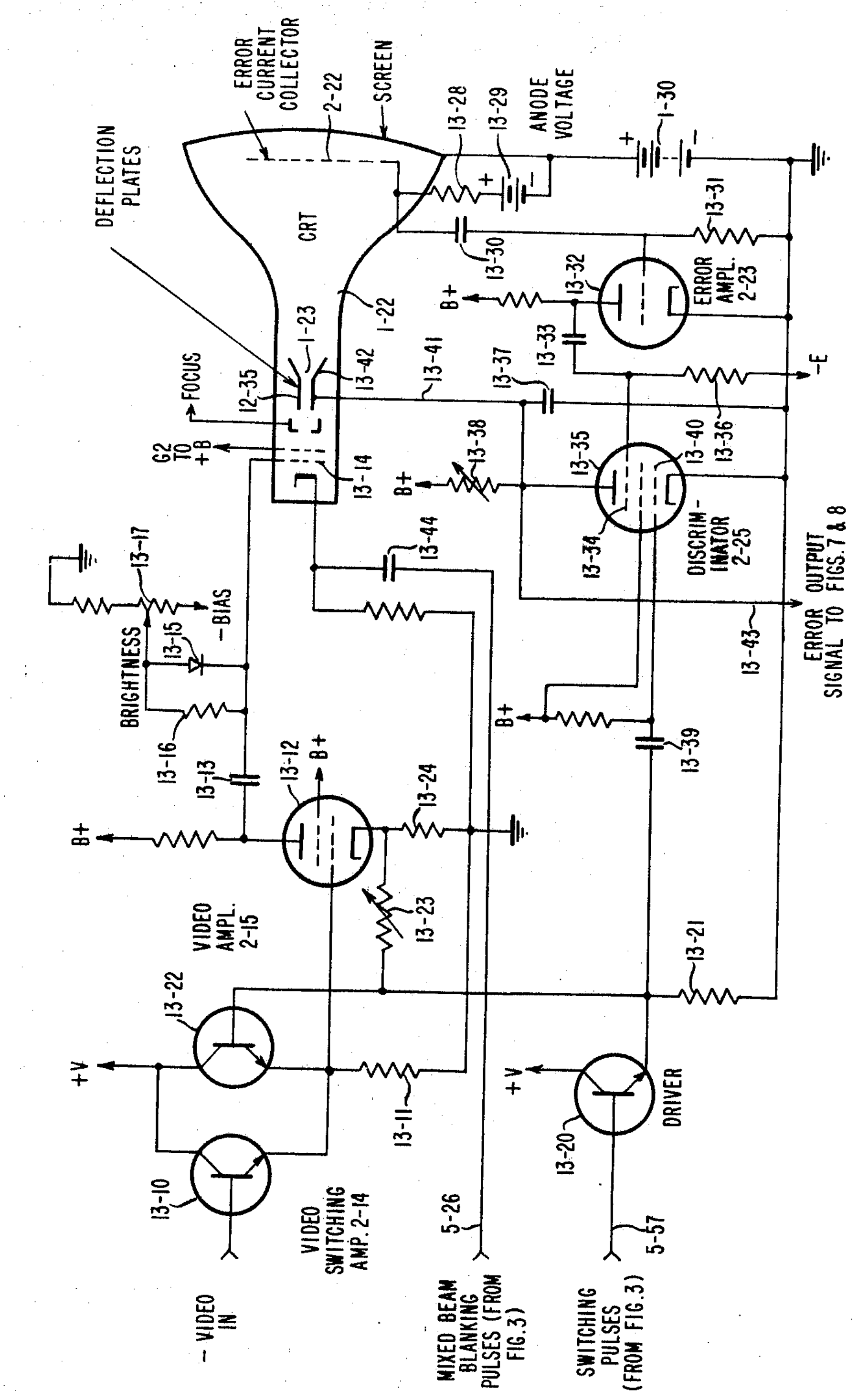
FIG. 5 is an electrical circuit diagram of an automatic position error correction system as used in the FIG. 1 embodiment of the invention.

The Automatic position error correction system has the circuit arrangement shown in FIG. 5 and includes a transistor 13–10 which receives and translates the video signal developed in the output circuit of the video amplifier 1–20. The transistor amplifier 13–10 is of the emitter-follower type and includes an emitter resistor 13–11 across which the video signal voltage is developed. The video signal is applied to the control electrode of a power amplifier tube 13–12 provided in the video amplifier 2–15, and the amplified video signal developed in the anode circuit of this tube is coupled through a condenser 13–13 to the beam modulation control electrode 13–14 of the cathode-ray tube 1–22. The amplified video signal is peak-stabilized on its black reference level in conventional manner by use of a diode rectifier 13–15 and shunt connected resistor 13–16 through which the control electrode 13–14 is negatively biased from a manually adjustable brightness control potentiometer 13–17 as shown.

During each error correction operational interval, a switching pulse generated in the output circuit 5–57 of the switching pulse generator 2–12 is supplied to the base electrode of an emitter-follower transistor 13–20 to develop across an emitter resistor 13–21 a positive polarity switching pulse. This pulse is applied to the base electrode of a transistor 13–22 operating as an emitter-follower and utilizing the emitter resistor 13–11 in common with the emitter of the transistor 13–10. The switching pulse is also applied to the cathode electrode of an amplifier tube 13–12, which comprises the video amplifier 2–15, through a potential divider comprising an adjustable resistor 13–23 and a cathode resistor 13–24. The switching pulse renders the transistor 13–22 conductive to produce across the emitter-resistor 13–11 a positive potential pulse of sufficient amplitude to render the transistor 13–10 nonconductive and thus halt translation of the video signal to the amplifier tube 13–12. At the same time, the switching pulse developed across the emitter-resistor 13–11 is applied to the control electrode of the amplifier tube 13–12 but a portion of the pulse is concurrently applied to the cathode of this tube with an amplitude selected by adjustment of the value of the resistor 13–23. The resulting net amplitude of the switching pulse applied between the control electrode and cathode of the amplifier tube 13–12 develops in the output circuit of this tube a reference amplitude pulse which establishes a reference value of cathode-ray beam current. The latter in turn establishes the maximum amplitude of secondary electron emission from the secondary electron emissive error correction stripes 4–12 provided on the fluorescent screen of the cathode-ray tube as previously described in relation to FIG. 2*a*.

The secondary electrons emitted from the secondary emissive error correction stripes last mentioned are collected by the grid structure 2–22 which is positively biased, through a resistor 13–28 from a potential source 13–29, to a higher potential than the final anode of the catthode-ray gun as energized by the high voltage anode supply 1–30 here shown for convenience as comprised by a battery. The collector structure 2–22 is coupled through a condenser 13–30 to a resistor 13–31, and the collected secondary-emitted electrons accordingly develop aross the resistor 13–31 an error correction pulse voltage of negative polarity. This voltage is applied to the error pulse amplifier 2–23 which includes a triode amplifier tube 13–32 normally having a zero value of control electrode-cathode bias and thus being normally fully conductive. The error control pulses applied to the control electrode of the tube 13–32 produce positive polarity error correction pulses in the anode circuit of this tube, and these positive pulses are coupled through a condenser 13–33 to a control electrode 13–34 of a pentode tube 13–35 included in the error discriminator unit 2–25. The control electrode 13–34 is connected through a resistor 13–36 to a negative bias voltage of such value that the tube 13–35 is biased to anode-current cut-off in the absence of such applied positive pulse. The non-conductive or cut-off state of the tube 13–35 permits a condenser 13–37 to charge through an adjustable resistor 13–38 included in the anode energizing circuit of the tube 13–35. The switching pulses developed across the resistor 13–21 as earlier explained are coupled through a condenser 13–39 to a high transconductance control electrode 13–40 of the tube 13–35 so that each switching pulse turns on the anode current of the tube 13–35 to an extent dependent upon and varying with the error pulse of constant amplitude but variable duration applied to the control electrode 13–34 from the error amplifier tube 13–32. The resultant increased conductivity of the discriminator tube 13–35 accordingly discharges the condenser 13–37 to an amount varying with the pulse duration of the error correction pulse applied to the control electrode 13–34. It will be evident that the condenser 13–37 thus increases its charge in the interval between swtching pulses but has its charge reduced by the error pulses during each error correction operation of the error correction system so that its amplitude during each error correction operation and during the interval between error correction operations varies in a manner represented by curve I or curve I′ of FIG. 2.

Each such error correction change of the potential developed across the condenser 13–37 is cumulative during each line trace and retrace interval and, as earlier mentioned, changes in amplitude during the line trace interval according to the nature and extent of any sweep amplitude or phase errors of the horizontal scan system. The error correction voltage thus developed across the condenser 13–37 is applied through a conductor 13–41 to the deflecting plate 13–42 of the air of deflection plates 1–23 included in the cathode-ray tube to maintain the scanning beam correctly positioned in relation to the vertically oriented lagging edges of successive ones of the secondary electron emissive stripes. The error correction voltage is also supplied through an output circuit 13–43 extending to the horizontal oscillator 1–27 and the horizontal amplifier 1–28 for purposes which will be explained hereinafter in describing the construction and operation of these units.

The mixed beam blanking pulses generated in the output circuit 5–26 of the generator previously described in connection with FIG. 3 are supplied through a coupling condenser 13–44 to the cathode of the cathode-ray tube 1–22 to extinguish the cathode-ray beam during the occurrence of each phase reference pulse and also during the horizontal line retrace blanking interval. This extinction of the cathode-ray beam principally serves to prevent reproduction by the tube 1–22 of any transients which may occur by reason of the initiation and termination of each error correction operation and the line retrace blanking operation.

Figure 6:
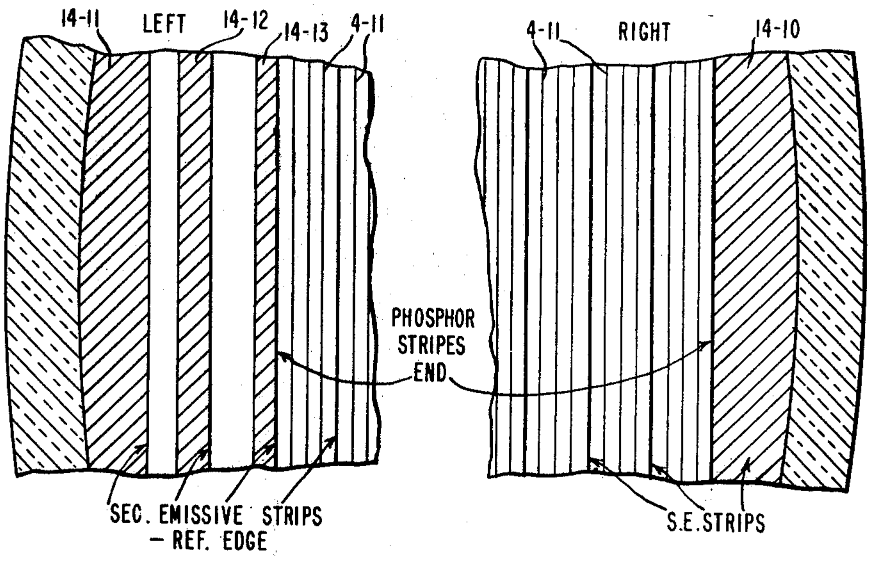
FIG. 6 illustrates constructional features of the image reproducing cathode-ray tube fluorescent screen, which features are preferably provided for enhanced operation of the error correction system of the invention.

The arrangement of the secondary emissive retrace-correction stripes earlier mentioned as being positioned to the right and left of the image area are illustrated in FIG. 6. There is one such stripe 14–10 positioned at the right-hand side (viewed from the front of the image reproducing tube) and a plurality of such stripes 14–11, 14–12 and 14–13 positioned at the left of the image area. The left-hand edge of the stripe 14–10 and the right-hand edges of the stripes 14–11, 14–12 and 14–13 are made linear and are oriented normal to the direction of horizontal beam scanning movement to provide at the left side of the image area a vertically oriented index line from which each scan trace begins. As just explained in connection with the error correction system of FIG. 5, a standard reference value of beam current is established during each error correction interval defined by the switching pulses. This continues through the retrace interval (even though the video signal is at the black amplitude level) except during the horizontal retrace blanking interval when the cathode-ray beam of the cathode-ray tube is extinguished by a blanking pulse generated by the FIG. 3 generator and supplied to the cathode of the tube through the coupling condenser 13–44 of the error correction system. Thus error correction of the beam positioning continues to the right of the image area until the blanking pulse begins, and resumes when the cathode-ray beam reaches its retrace position at the left and begins to move forward toward the image reproduction area. The corrective action in this instance is more rapid since the beam remains on the wide emissive stripes 14–10 to 14–13 throughout the error correction interval and the error correction pulses have thus prolonged pulse durations until such time as the beam is positioned just to the right edge of the innermost secondary emissive stripe 14–13 which occurs at the time the beam is ready to begin its scan across the image reproduction area.

AUTOMATIC FREQUENCY DISCRIMINATOR UNIT 1–26 AND HORIZONTAL OSCILLATOR 1–27

Figure 7:
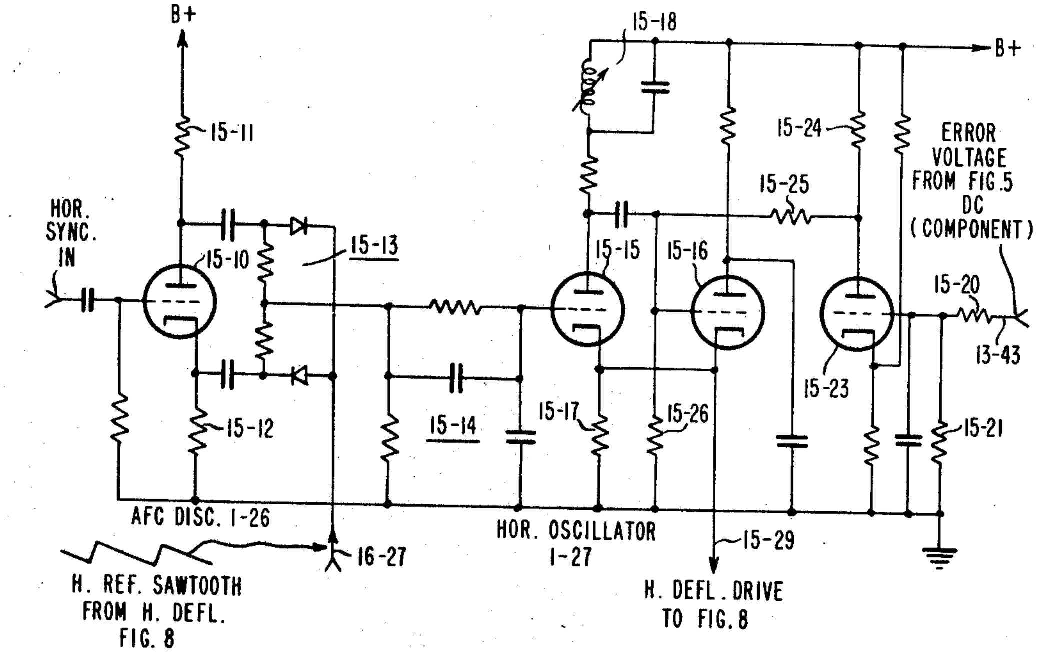
FIGS. 7 and 8 show the electical circuits of improved horizontal scan units preferably employed in an image reproduction system utilizing the error correction system of the present invention.

The automatic frequency discriminator and horizontal oscillator units have a circuit arrangement shown in FIG. 7 and include a conventional phase detector comprised by a phase-splitter triode vacuum tube 15–10 having a control electrode to which the horizontal synchronizing pulses are applied from the synchronizing signal separator 1–24. The tube 15–10 includes an anode load resistor 15–11 and cathode resistor 15–12 across which horizontal synchronizing pulses are developed with opposite polarities. These opposite polarity pulses are supplied to a rectifier system 15–13 which also receives horizontal reference saw-tooth potentials supplied from the output circuit 16–27 of the horizontal deflection amplifier hereinafter more fully described in connection with FIG. 8. A phase reference control potential is developed in the output circuit of the rectifier system 15–13 and is supplied through an RC filter network 15–14 to the control electrode of a triode tube 15–15. The latter is included with a triode tube 15–16 in a conventional cathode-coupled form of multivibrator utilizing a common cathode resistor 15–17 and having a horizontal frequency stabilizing shunt resonant circuit 15–18 included in the anode circuit of the tube 15–15.

Too large a positive voltage on the control electrode of the tube 15–15 or a negative voltage on the control electrode of the tube 15–16 tends to lower the periodicity of operation of the multivibrator, and this has the ultimate effect of delaying the deflection of the cathode-ray beam of the cathode-ray tube with respect to the horizontal synchronizing pulses. This is equivalent to having the reproduced image shift to the left on the image reproducing area of the cathode-ray tube. Such a shift causes the error correction pulses to increase in duration and thus the error correction voltage developed in the output circuit 13–43 of the error correction system to decrease in amplitude for reasons previously explained in connection with FIG. 5. The error correction voltage is applied from the output circuit 13–43 of the error correction system through a resistive potential divider comprised by a series resistor 15–20 and a shunt resistor 15–21, and an error correction voltage of reduced amplitude is applied to the control electrode of a triode tube 15–23 having an anode load resistor 15–24. The anode potential of the tube 15–23 is applied through a resistive potential divider comprised by a resistor 15–25 and a resistor 15–26 to the control electrode of the multivibrator tube 15–16. A decrease in the magnitude of the error correction voltage applied to the tube 15–23 effects an increase of its anode voltage, and this is equivalent to applying a positive voltage to the control electrode of the tube 15–16 thus to raise the frequency of multivibrator oscillation which is equivalent to shifting the reproduced image to the right and thereby reduce the duration of the error corrective pulses supplied to the error correction system.

Thus the error correction voltage applied to the tube 15–23 provides an auxiliary phase stabilization against any tendency of the multivibrator oscillator to shift in frequency. In the use of auxiliary phase stabilization such as just described with normal phase lock and the usual horizontal scan amplitude control, the range of auxiliary operation should be limited to prevent the fine control of the auxiliary system from taking control during wide range adjustments of the horizontal scan deflection circuits. Such limiting is achieved by selection of the component values of the components associated with the tube 15–23 to provide control limits at each end of a small high gain amplitude range.

THE HORIZONTAL DEFLECTION UNIT 1–28 AND HIGH VOLTAGE UNIT 1–30

Figure 8:
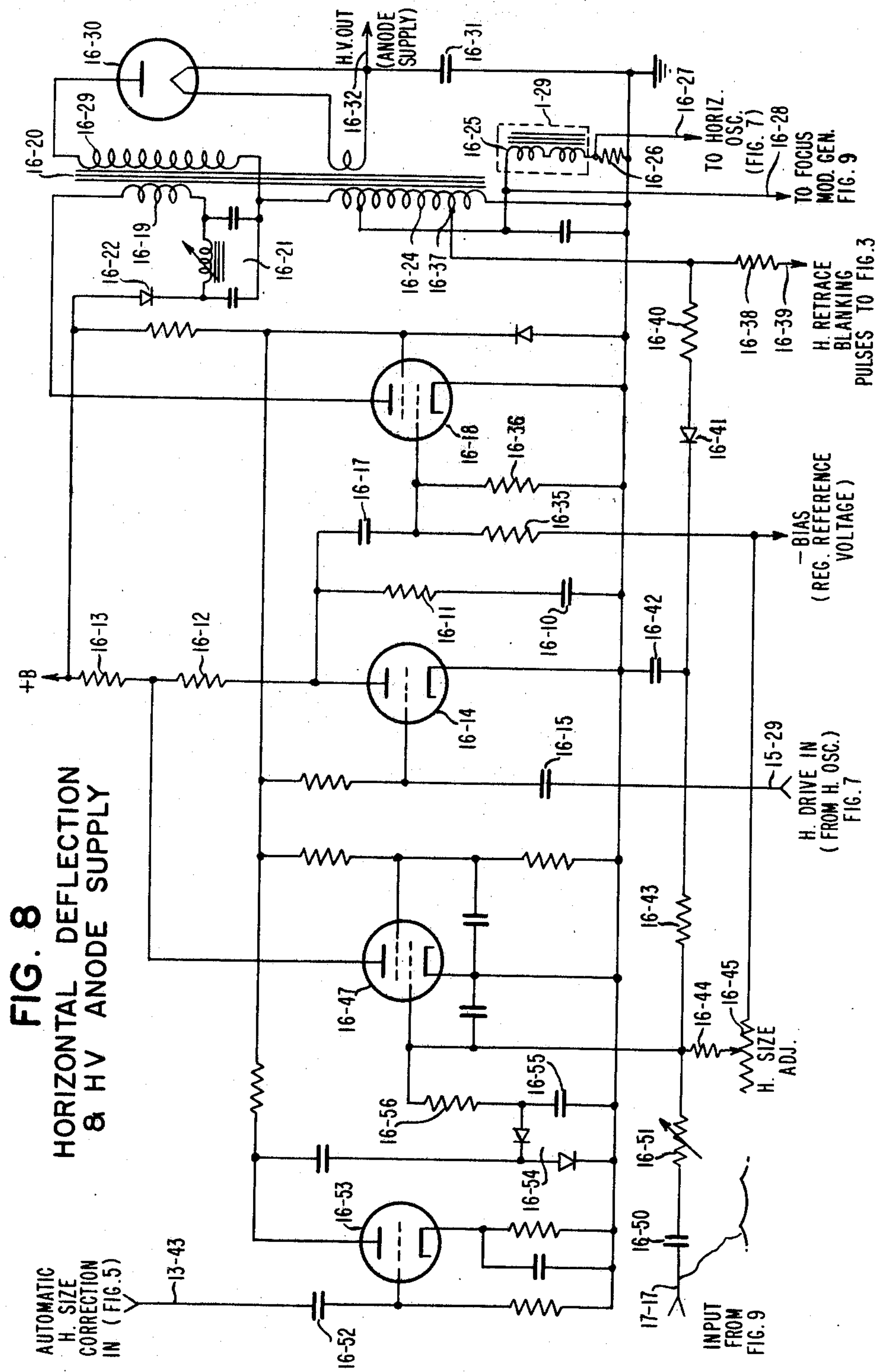

The circuit arrangement of the horizontal deflection system and high voltage anode supply are shown in FIG. 8.

The horizontal deflection system includes a condenser 16–10 which is charged during the horizontal trace interval through a resistor 16–11 and series resistors 16–12 and 16–13. The condenser 16–10 is discharged during the horizontal retrace interval by a triode tube 16–14 which is rendered conductive by positive polarity horizontal drive pulses applied to its control electrode through a coupling condenser 16–15 from the output circuit 15–29 of the horizontal oscillator just described in connection with FIG. 7. The resultant saw-tooth and pulse voltage developed in the anode circuit of the tube 16–14 is coupled through a condenser 16–17 to the control electrode of a power amplifier tube 16–18. The amplifier tube 16–18 energizes the primary winding 16–19 of a horizontal scan transformer 16–20, the energizing circuit including a conventional B-boost circuit comprised by an L-C network 16–21 and a diode rectifier 16–22. The boost voltage energy is stored in the condensers of the network 16–21 and the adjustable inductor of this network provides conventional linearity correction. The transformer 16–20 includes a secondary winding 16–24 which energizes the horizontal scan winding 16–25 of the scanning yoke 1–29 through a resistor 16–26 across which there is developed a potential of saw-tooth waveform for supply through an output circuit 16–27 to the phase detector just described in connection with FIG. 7.

The high voltage supply 1–30 is conventional and includes a high voltage winding 16–29 provided on the transformer 16–20 and a rectifier 16–30 which develops across a filter condenser 16–31 a unidirectional high voltage for energization of the cathode-ray tube through a high voltage output circuit 16–32.

In order to achieve optimum horizontal scan linearity and to enable the horizontal deflection system to respond to an amplitude control signal in a manner presently to be described, the power amplifier tube 16–18 is operated above the "knee" of its screen-anode saturation characteristic and a fixed value of negative bias potential is supplied to its control electrode from a regulated or constant-amplitude source of negative voltage through a resistive potential divider comprised by series resistor 16–35 and 16–36. Under these operating conditions and with proper choice of circuit component values, the amplitude of the saw-tooth and pulse energization of the scan transformer 16–20 varies linearly with changes in the potential at the juncture of the resistors 16–12 and 16–13 which potential controls the magnitude of the charging current supplied to the condenser 16–10. The manner in which changes of the amplitude of this control potential are effected will now be considered.

A tap 16–37 on the transformer secondary winding 16–24 provides horizontal retrace blanking pulses which are supplied through a resistor 16–38 to an output circuit 16–39 extending to the generator unit previously described in connection with FIG. 3. These pulses are also supplied through a resistor 16–40 and a rectifier 16–41 to a condenser 16–42 to develop across the latter a positive unidirectional voltage varying in amplitude with the horizontal deflection scan amplitude. This voltage is coupled through a resistive potential divider comprised by a resistor 16–43, a resistor 16–44, and an adjustable resistor 16–45 to the negative regulated bias voltage source earlier mentioned. The resistive potential divider last mentioned effectively compares the positive voltage developed across the condenser 16–42 with a portion of the negative bias voltage and the net voltage of comparison is applied to the control electrode of an amplifier tube 16–47 having its anode connected to the juncture of the resistors 16–12 and 16–13. The net voltage applied to the control electrode of the tube 16–47 normally has a small negative value, and an increase in the voltage developed across the condenser 16–42 with increase in the horizontal deflection scan amplitude accordingly effects increased conductivity of the amplifier tube 16–47. This produces a larger voltage drop across the resistor 16–13 to decrease the amplitude of the saw-tooth and pulse voltage applied to the power amplifier tube 16–18, thus reducing the horizontal deflection scan amplitude. Conversely, a reduced value of voltage developed across the condenser 16–42 by a reduced horizontal deflection scan amplitude effects an increase of the saw-tooth-pulse voltage applied to the power amplifier tube 16–18 to increase the horizontal deflection scan amplitude. Thus a small change in the horizontal scan amplitude so controls the amplifier tube 16–47 as to provide by action of the latter a regulator control of the correct polarity to stabilize the voltage of the condenser 16–41 and thus stabilize the horizontal deflection scan amplitude. Adjustment of the value of the resistor 16–45 effects adjustment of the magnitude of the net voltage supplied to the control electrode of the tube 16–47 and accordingly provides a convenient horizontal size control coarse adjustment.

It will be apparent that control of the horizontal deflection scan amplitude may be effected by applying an appropriate potential to the control electrode of the regulator amplifier tube 16–47. Thus the parabolic vertical-frequency voltage developed in an output circuit of the focus modulation generator 2–27 may be applied with positive polarity through a condenser 16–50 and an adjustable resistor 16–51 to the control electrode of the regulator tube 16–47 to produce a scanning raster on the fluorescent screen of the cathode-ray tube having decreased width at the top and bottom. This is the correction necessary for pincushion distortion, and accordingly a raster with straight sides may readily be attained.

It was previously explained in connection with the error control system of FIG. 5 that the amplitude of the error signal during a horizontal line trace interval is a measure of the difference between the size of the fluorescent screen with its secondary emissive error-correction stripes and the horizontal scan size. The error correction signal may thus be applied from the output circuit 13–43 of the error correction system through a coupling condenser 16–52 to the control electrode of an amplifier tube 16–53 for amplification of the signal and its peak-to-peak rectification by a rectifier system 16–54. The resultant unidirectional potential developed across the rectifier output condenser 16–55 is supplied through a resistor 16–56 to the control electrode of the regulator tube 16–47. The polarity of this voltage is such that an increase in the amplitude of the error signal during a line trace interval causes an increase in the horizontal deflection scan amplitude, thereby reducing this error. The error correction system output potential thus enables control of any scan distortion and drift which occur in the horizontal scanning system at frequencies below the horizontal line scanning frequency.

FOCUS MODULATION GENERATOR 2–27

For optimum resolution of reproduced image detail over the entire image reproduction area, it is desirable that the cathode-ray beam retain a uniform cross-sectional size as it traverses the entire image area. The principal factor affecting beam cross-sectional size at the fluorescent screen is beam defocusing. It results from the fact that the focal distance changes with beam position on the fluorescent screen as a result of the relatively flat face plate typically used in the cathode-ray tube. Correction of any beam defocusing may be achieved by refocusing the beam during the vertical and horizontal line scanning intervals as the beam moves from edge to edge and top to bottom of the cathode-ray tube having an electrostatic focus element. The focus correction may be accomplished by applying to the focus element a relatively large voltage having both horizontal and vertical negative parabolic voltage components.

Figures 9, 9A:
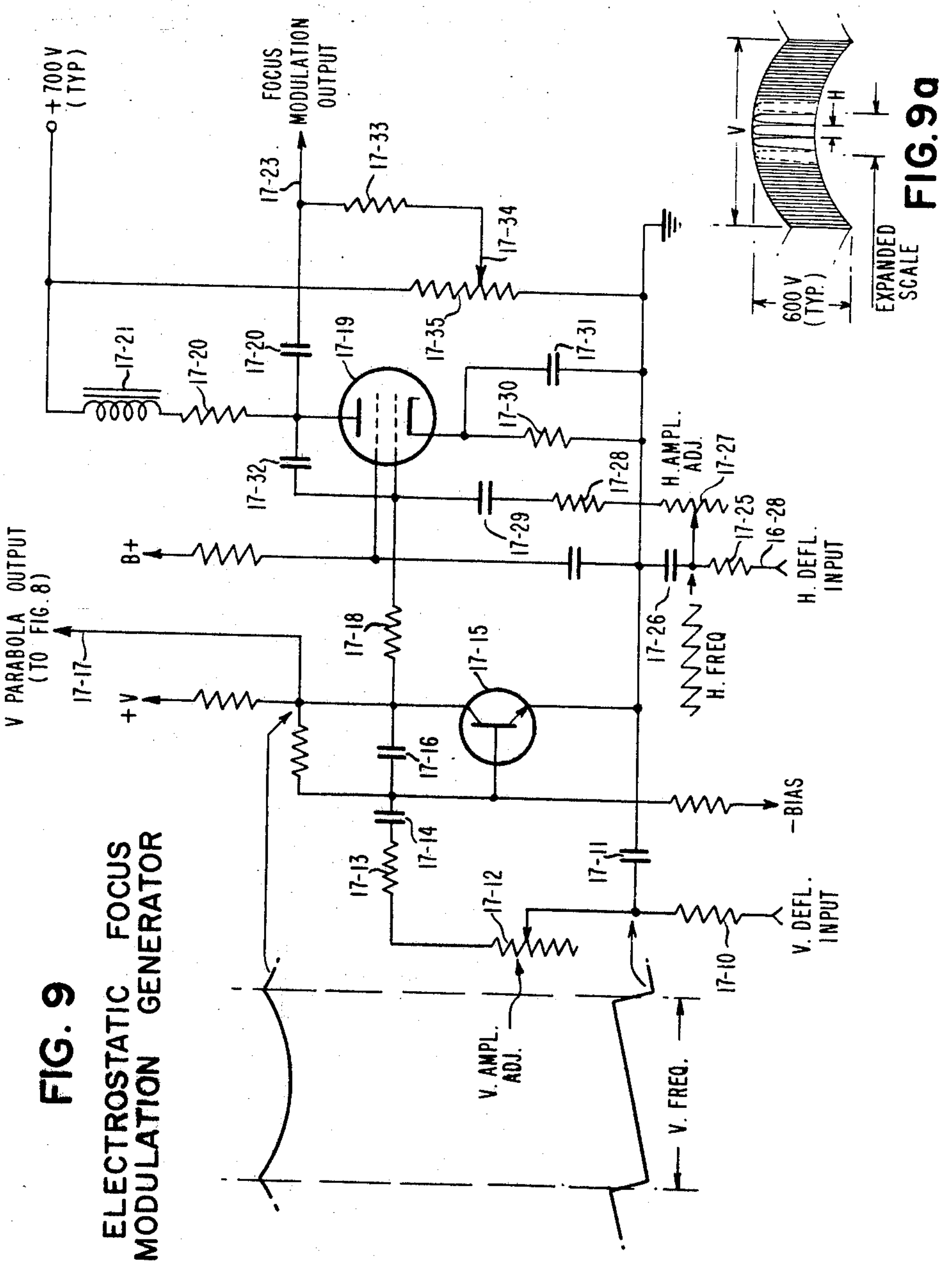
FIG. 9 is the electrical circuit diagram of an electrostatic focus modulation generator shown schematically in the arrangement of FIG. 1.
FIG. 9*a* graphically represents certain voltage waveforms developed in the FIG. 9 generator.

The focus modulation generator has a circuit arrangement shown in FIG. 9. The vertical deflection voltage developed across the vertical deflection winding of the deflection yoke 1–29 is applied through a resistor 17–10 connected in series with a condenser 17–11 to derive across the latter the saw-tooth scanning voltage component of vertical scan frequency. This derived voltage is applied through an adjustable resistor 17–12, a resistor 17–13, and a coupling condenser 17–14 to the base electrode of a transistor amplifier 17–15. A condenser 17–16 coupled between the collector and base electrodes of the transistor 17–15 causes the latter to operate as an integrator-amplifier-inverter to provide a positive polarity parabolic voltage of vertical scanning frequency at its collector electrode. This voltage is supplied through an output circuit 17–17 to the horizontal deflection system earlier described in connection with FIG. 8. The resistor 17–12 provides an adjustment of the amplitude of the output parabolic voltage.

The parabolic voltage developed in the collector circuit of the transistor 17–15 is also directly coupled through a resistor 17–18 to the control electrode of an amplifier tube 17–19 having its anode energized from a suitable source of voltage through an anode load resistor 17–20 and a decoupling choke 17–21. The amplified parabolic voltage is inverted in polarity by the amplifier tube 17–19 and is coupled through a coupling condenser 17–22 to a focus modulation output circuit 17–23 which is connected to the focus electrode of the image reproducing tube.

The horizontal scanning voltage developed across the horizontal scanning winding of the scanning yoke 1–29 by the horizontal deflection system just described in connection with FIG. 8 is supplied from the output circuit 16–28 of the latter to an RC integrating network comprised by a series resistor 17–25 and a series condenser 17–26 to develop across the latter the line frequency sawtooth component of the horizontal scan voltage. This sawtooth potential is applied through an adjustable resistor 17–27, a resistor 17–28, and a coupling condenser 17–29 to the control electrode of the tube 17–19. The control electrode-cathode bias of this tube is provided by a cathode resistor 17–30 having a shunt-connected condenser 17–31. A condenser 17–32 couples the anode and control electrode of the tube 17–19, and the value of this condenser and those of the coupling condenser 17–29 and cathode condenser 17–31 are selected sufficiently small as to have impedance at the vertical scanning frequency so that they do not affect the amplifying characteristics of the tube 17–19 with respect the vertical frequency parabolic voltage. The condensers 17–29, 17–31 and 17–32 nevertheless have sufficiently low impedances, and the decoupling choke 17–21 has sufficiently high impedance, at the horizontal scanning frequency as to cause the tube 17–19 to operate as a feedback integrator-amplifier by reason of the feedback condenser 17–32 and thus convert the input sawtooth voltage to one of line-frequency parabolic waveform. The amplified voltage of parabolic waveform likewise is coupled through the coupling condenser 17–32 to the output circuit 17–23, and the amplitude of the parabolic voltage is adjusted by adjustment of the resistor 17–27. A unidirectional focusing voltage of selectable amplitude is also applied to the focus output circuit 17–23 through a series-resistor 17–33 from the adjustable contact 17–34 of a potentiometer 17–35 connected across the energizing voltage for tube 17–19. The resultant focus modulation voltage supplied to the output circuit 17–23 has a unidirectional focus component of value selected by adjustment of the potentiometer contact 17–34, and has mixed vertical-frequency and horizontal frequency parabolic components of values selected by adjustment of the respective resistors 17–12 and 17–27 and thus is one suitable to provide overall uniform focus of the cathode-ray beam during its vertical and horizontal scanning movement over the fluorescent screen of the tube. The composite waveform of this output voltage, neglecting the unidirectional focusing component, is similar to that graphically shown in FIG. 9*a*.

Figures 10A, 10B:
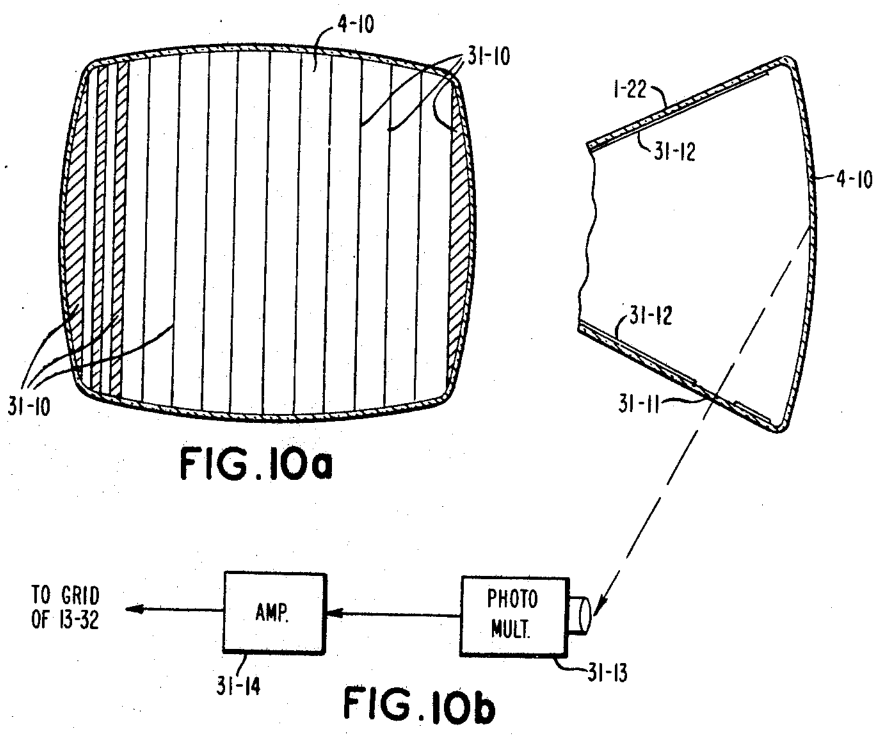
FIGS. 10*a* and 10*b* illustrate an automatic error correction system embodying the present invention in a modified form thereof.

In the image reproduction system described above, error correction is accomplished by secondary electron emission from secondary emissive stripes at the reference positions of the fluorescent screen. Error correction can also be accomplished by numerous equivalent energy emissive structures providing a change of emissive energy level indicative of the beam positioning. Thus as illustrated in FIG. 10*a*, the fluorescent screen may be provided with spaced narrow stripes of an ultraviolet emissive phosphor 31–10 at the spaced error reference positions, and with terminal broad stripes of such phosphor at the sides of the image reproduction area equivalent to the emissive stripes 14–10 to 14–13 described in relation to FIG. 6. The ultraviolet energy emitted when the cathode ray beam strikes each such stripe is projected through an ultraviolet transmissive window 31–11 provided in the usual anode graphite film 31–12 which conventionally coats the flared bulb portion of the picture tube 1–22 as illustrated in FIG. 10*b*, is received by a conventional photomultiplier tube 31–13, and the resultant error correction electrical pulses developed in the output circuit of the latter are amplified by an amplifier 31–14 and supplied to the control electrode of the error amplifier tube 13–32 included in the automatic position error correction system described in relation to FIG. 5.

While there have been described specific embodiments of the invention for purposes of illustration, it is contemplated that numerous changes may be made without departing from the spirit of the invention.

What is claimed is:

1. An error correction system for cathode-ray tube information display comprising a cathode-ray tube having electrostatic beam deflection electrodes oriented for beam deflection in a preselected scan direction; major scan means including a scanning yoke associated with said tube for controlling the cathode-ray beam of said tube to scan the fluorescent screen thereof by a beam trace displacement progressing in said scan direction; translating means for modulating the intensity of said beam during each trace to effect information display by said tube; a plurality of secondary-electron emissive beam-position indexing stripe elements having edge portions oriented normal to said scan direction and uniformly spaced across the fluorescent screen of said tube from edge to edge of the display area thereof to provide by beam scan motion periodic changes of beam-induced secondary electron emissions from said elements indicative of a prevailing positional relationship in said direction between said beam and successive ones of said elements; a non-secondary-electron-emissive stripe portion following each said element in said direction of scan; corresponding edge portions of said elements being spaced by a value incrementally larger than the constant velocity scanning displacement of said beam during a preselected time interval; means for generating an electrical pulse potential having brief pulse duration and of pulse periodicity corresponding to the reciprocal of said preselected time interval; means responsive to each pulse of said pulse potential for generating and supplying to said beam deflection electrodes a minor deflection signal having forward-scan step signal components at the initiation and termination of said each pulse for rapidly moving said beam forwardly from said fluorescent screen onto an adjacent stripe element and for subsequently rapidly moving said beam forwardly from an error-corrected adjustment position in relation to said adjacent stripe element and onto said fluorescent screen, having a saw-tooth reverse-scan signal component during said each pulse for halting the scan motion of said beam on said adjacent stripe element to permit an error correction adjustment positioning of said beam, and having in the interval between successive of said pulses a saw-tooth forward-scan signal component for increasing the forward scanning velocity of said beam in the intervals between said successive pulses; means responsive to each pulse of said pulse potential for controlling said translating means to terminate said information display by said tube during said each pulse and for establishing a preselected value of beam current to establish a preselected minimum value of said beam-induced secondary-electron emission; means responsive to said periodic changes of beam-induced secondary-electron emission for developing and supplying to said deflection electrodes a beam-positional error corrective electrical signal incrementally to advance in said direction the prevailing deflection position of said beam to move said beam from an emissive stripe element substantially onto the associated non-emissive stripe portion; and means in said major scan means and responsive to said error corrective electrical signal for providing supplementary control thereby of the length, centering and linearity of each complete traversal of said beam over said fluorescent screen under control of said major scan means.

2. An error correction system for a cathode-ray tube comprising means for controlling the cathode-ray beam of said tube to scan the screen area thereof by beam trace displacement progressing in a preselected scan direction during one or more trace time intervals, a plurality of information areas and therebetween corresponding beam position indexing stripe elements wherein each stripe element comprises adjacent portions each with different characteristic response to beam impingement thereon to provide at the boundary of said adjacent portions an index line oriented normal to said scan direction and wherein said stripe elements are spaced across the screen area to provide by beam scan motion and said response difference successive changes of an emissive energy level indicative of a prevailing positional relationship in said scan direction between said beam and successive ones of said index lines, means establishing successive discrete reference time intervals during each said trace interval and corresponding in number to the number of said stripe elements, means responsive to said energy level change to generate an index signal having two discrete levels corresponding to beam impingement on said stripe element portions to indicate thereby the direction of displacement of the beam from a corresponding index line, and means utilizing those components of said index signal occurring only during said reference time intervals for adjusting the prevailing deflection position of said beam during each trace time interval in said scan direction and in relation to a corresponding one of successive stripe elements to maintain a preselected positional relationship between the prevailing position of said beam and each of successive ones of said indexing lines.

3. An error correction system for a cathode-ray tube according to claim 2, wherein said utilizing means utilizes said index signal during each said successive reference time interval for incrementally displacing the prevailing deflection of said beam in relation to a corresponding one of said index lines successively to effect said adjustment of the prevailing deflection position of said beam.

4. An error correction system for a cathode-ray tube according to claim 3, which includes scan-halt control means for briefly halting the scanning motion of said beam during each reference time interval when said beam is at each succeeding one of said stripe elements to permit each said adjustment by incremental displacement of the prevailing deflection position of said beam by said utilizing means.

5. An error correction system for a cathode-ray tube according to claim 4, wherein said scan-halt control means increases the scanning velocity of said beam in the intervals between the halted scanning motions thereof.

6. An error correction system for a cathode-ray tube according to claim 2, wherein said indexing stripe elements are spaced across the screen of said tube by a value incrementally larger than the scanning displacement of said beam during the time between successive ones of said reference time intervals, and wherein said utilizing means utilizes said index signal during each said successive time reference interval for incrementally advancing in said direction and during each said reference time interval the prevailing deflection position of said beam.

7. An error correction system for a cathode-ray tube according to claim 2, wherein said indexing stripe elements are fabricated of a first portion material characterized by substantial beam-induced secondary-electron emission and a second portion material characterized by low beam-induced secondary electron emission, and wherein said utilizing means utilizes the difference of beam-induced secondary electron emissions from said element portions for developing an electrical signal having constant first and second levels corresponding to said beam impingement on said first and second element portions thereby to indicate said beam direction in relation to the corresponding one of said index lines.

8. An error correction system for a cathode-ray tube according to claim 7, which includes means for generating an electrical pulse potential of brief pulse duration and of pulse periodicity related to a preselected desired value of beam-scan displacement in said direction and at uniform velocity during a preselected unit of time, means responsive to each pulse of said potential for establishing a preselected value of cathode-ray beam current to establish a preselected value of said beam-induced secondary-electron emission, and wherein said utilizing means includes means responsive to each pulse of said electrical pulse potential for generating a minor deflection signal having a reverse-scan signal component during said each pulse and forward-scan step components at the initiation and termination of said each pulse, and means responsive to said step components of said minor deflection signal for rapidly moving said beam forwardly from said information area onto an adjacent stripe element and for subsequently rapidly moving said beam forwardly from an error-corrected adjustment position in relation to said adjacent stripe element and to said information area and responsive to said reverse-scan component of said minor deflection signal for halting the scanning motion of said beam on said adjacent stripe element to permit said adjustment by said utilizing means of the prevailing deflection position of said beam.

9. An error correction system for a cathode-ray tube according to claim 8, wherein said minor deflection signal generating means additionally generates in the interval between the pulses of said electrical pulse potential a forward-scan component of said minor deflection signal, and wherein said minor deflection signal responsive means is responsive to said forward-scan signal component for incrementally increasing the scan velocity of said beam in the intervals between the halted scanning motions thereof.

10. An error correction system for a cathode-ray tube according to claim 2, wherein said indexing stripe elements are uniformly spaced across the sceen of said tube by a value related to the scanning displacement of said beam during the time between successive ones of said reference time intervals, and wherein said utilizing means includes control means operative during said reference time intervals for establishing during each said reference time interval a preselected value of cathode-ray beam current thereby to establish a preselected value of said emissive energy level change and includes means controlled by said control means and responsive to said index signal component for periodically effecting said adjustment of the prevailing deflection position of said beam.

11. An error correction system for a cathode-ray tube according to claim 2, wherein said utilizing means adjusts said prevailing deflection position of said beam by incrementally displacing said beam from each said first portion onto each said second portion of said indexing stripe element substantially to achieve for each said reference time interval a preselected positional relation between said beam and said corresponding index line.

12. An error correction system for a cathode-ray tube according to claim 2, which includes means for generating an electrical pulse potential of brief pulse duration corresponding to each said reference time interval, and wherein said utilizing means is responsive to said index signal only during said pulse duration for effecting said adjustment of the prevailing deflection position of said beam.

13. An error correction system for a cathode-ray tube according to claim 12, wherein said utilizing means includes means responsive to each pulse of said electrical pulse potential for generating a minor deflection signal having during said each pulse a reverse-scan signal component, and means responsive to said reverse-scan component of said minor deflection signal for halting the scanning motion of said beam each time said beam scans a successive one of said stripe elements to permit said brief adjustment by said utilizing means of the prevailing deflection position of said beam.

14. An error correction system for a cathode-ray tube according to claim 13, wherein said minor deflection signal generating means additionally generates a forward-scan signal component in the intervals between pulses of said pulse potential and wherein said minor deflection signal responsive means is responsive to said forward-scan component to increase the forward scanning velocity of said beam in the intervals between the pulses of said electrical pulse potential.

15. An error correction system for a cathode-ray tube according to claim 12, wherein said utilizing means includes means responsive to each pulse of said electrical pulse potential for generating a minor deflection signal having a reverse-scan component during said each pulse and forward scan step components at the initiation and termination of said each pulse, and means responsive to said step components of said minor deflection signal for rapidly moving said beam forwardly from said information area onto an adjacent stripe element and for subsequently rapidly moving said beam forwardly from an error-corrected adjustment position in relation to said adjacent stripe element and onto said information area and responsive to said reverse-scan component of said minor deflection signal for halting the scan motion of said beam on said adjacent stripe element to permit said adjustment by said utilizing means of the prevailing deflection position of said beam.

16. A cathode-ray tube error correction system comprising scanning means for deflecting the cathode-ray beam over the face of the tube so that the beam deflection includes a component in a preselected scan direction, an information area in association with said face, one or more index stripes disposed across said information area in preselected fashion and oriented normal to said scan direction, said index stripes having a different characteristic response from the rest of said area due to beam impingement on said face, means responsive to a preselected level of said response for generating an index signal having on-off levels, means for generating a time reference pulse corresponding to a preselectedly correct time of dwell of the beam at a selected edge of each said index stripe, means operative to halt said beam scanning motion during said reference pulse intervals, means responsive to said reference pulse and to said index signal during each said reference pulse interval to apply an incremental deflection to said beam to correct its halted position to conform to each said selected index edge.

17. A cathode-ray tube error correction system comprising scanning means for deflecting the cathode-ray beam over the face of the tube, the deflection including an essentially constant velocity component in a preselected scan direction, one or more index stripes in association with said face and oriented normal to said scan direction and disposed across an information area associated with said face in preselected fashion, said index stripes having a characteristic response different from that of the rest of said area due to beam impingement on said face, means responsive only to the occurrence of said characteristic response for generating a constant level index signal, means for generating a relatively narrow time reference pulse corresponding to a preselectedly correct time of scan of said beam over a selected edge portion of each of said index stripes, means responsive to said reference pulse and to said index signal during the interval of each reference pulse to generate an output error signal proportional to the error in said time of scan of said beam over said index edge, means for utilizing each said error signal to apply an incremental correction of scan to said beam.

18. A cathode-ray tube error correction system comprising a cathode-ray tube having an electron beam and a face and in preselected association therewith an area comprising one or more alternate information stripes and index stripes of preselected widths and distributed over said area, said stripes being responsive to beam impingement on a corresponding portion of said face to perform a corresponding information or beam sensing function, scanning means for deflecting the beam over said face area and including means for generating an essentially uniform velocity component of beam scan normal to said stripes, means for generating from said index stripes and said corresponding beam impingement an index signal, control means successively repetitive corresponding to a desired time-positional relationship of said uniform velocity beam scan onto successive ones of said index stripes to define the occurrence of preselected reference time intervals, each reference time interval being different from the interval required for the scan of said beam across each said index stripe at said uniform velocity, said control means being operative to provide a minor component of deflection to alter the time of impingement of said beam on each said index stripe to correspond to said preselected reference time interval and to provide a constant velocity scan component during intermediate intervals to cause the beam to scan uniformly across information stripes, and means responsive to said index signal during said reference time intervals to develop an error control signal for correcting any departure in said time-positional relationship of said beam onto said index stripes.

19. A cathode-ray tube error correction system comprising scanning control means for deflecting the cathode-ray beam over the screen of the tube, said deflection including a component with preselected scan characteristics providing beam progression in a preselected direction across said screen during a scan interval, a plurality of index elements with edges thereof oriented normal to said scan direction and spaced across said screen each having a beam induced change in an emissive energy level when the beam traverses across said edge, means responsive to said emissive energy to provide an index signal having a discrete change in signal level corresponding to said energy change, said level being indicative of the direction of said beam in respect to said edge of a corresponding index element, means for generating a control signal having a plurality of time reference pulse intervals of preselected duration and each interval occurring at a preselectedly correct time of traversal of said beam scan across successive corresponding index elements, means utilizing said control signal and those components of said index signal occurring during said reference pulse intervals to generate an error correction signal to adjust the prevailing position of said beam during each said scan to correspond to said preselectedly correct time of traversal.

20. An error correction system for a cathode-ray tube in accordance with claim 19, wherein said utilizing means additionally utilizes said changes of emissive energy on a scan-traversal cumulative basis for supplementary control of said scan control means to correct the position of said beam at any preselected time during the scan of the screen thereby under control of said control means.

21. An error correction system for a cathode-ray tube in accordance with claim 19, wherein said utilizing means additionally utilizes said changes of emissive energy on a scan traversal cumulative basis for supplementary control of said scan control means to correct the centering of beam scan displacement over a scan interval during which said beam makes a complete traversal of the screen of said tube under control of said control means.

22. An error correction system for a cathode ray tube in accordance with claim 19, which includes a source of synchronizing signals, wherein said scanning control means is responsive to said synchronizing signals for effecting said control of the cathode-ray beam of said tube during each of repetitive beam scan traversals of the screen thereof in said preselected scan direction, and wherein said utilizing means additionally utilizes said changes of emissive energy on a scan traversal cumulative basis for supplementary control of said scan control means to provide supplementary correction of the phase of synchronization of said control means by said synchronizing signals.

23. An error correction system for a cathode-ray tube in accordance with claim 19, wherein said utilizing means additionally utilizes said changes of emissive energy on a scan traversal cumulative basis for supplementary control of said scan control means to provide supplmentary correction of the length of beam scan displacement over the screen of said tube.

24. A cathode-ray tube error correction system as defined in claim 19, in which said utilizing means comprises means for amplitude limiting said index signal about said discrete level change, a capacitive integrator, a pulse coincidence gate whose output charges said capacitive integrator to provide said error correction signal, and minor deflection circuit means operative from said error correction signal to provide said beam position adjustment.

25. An error correction system for a cathode-ray tube according to claim 19, wherein said utilizing means additionally utilizes said changes of emissive energy on a scan traversal cumulative basis for supplementary control of said scan control means to provide supplementary correction of the uniformity of scan displacement per unit of time as said beam scans the screen of said tube.

26. Beam positioning means for a cathode-ray tube in which the face of the tube includes one or more areas each having in preselected association therewith a boundary region comprising first and second adjacent portions which have different characteristic responses when the beam impinges thereon, circuit means for developing from impingement of the beam on the boundary region an index signal having a first level representative of beam impingement on said first boundary region portion and a second level representative of beam impingement on said second boundary region portion, means for deflecting the beam onto said first region during periodic correction intervals, means for developing a control pulse signal corresponding to each said correction interval, means comprising a signal gating circuit responsive to said control pulse signal and to that part of said index signal occurring during said correction interval for utilizing said first level of said index signal to deflect the beam from said first region onto said second region, which action shifts said index signal to said second level and terminates the deflection to provide a preselected positional relationship of the beam to one of said areas at the end of each of said correction intervals.

References Cited

UNITED STATES PATENTS

| | | | |
|---|---|---|---|
| 2,773,118 | 12/1956 | Moore. | |
| 2,871,403 | 1/1959 | Buckbee et al. | 315—21 |
| 2,900,562 | 8/1959 | Burns | 315—10 X |
| 2,917,571 | 12/1959 | Schwartz | 315—10 X |
| 2,962,546 | 11/1960 | Thompson | 315—10 X |
| 2,979,559 | 4/1961 | Burgett et al. | 315—21 X |
| 3,134,044 | 5/1964 | Auvil | 315—10 |
| 3,154,715 | 10/1964 | Jackson et al. | 315—10 |
| 3,163,713 | 12/1964 | Rudd | 315—10 X |
| 3,210,597 | 10/1965 | Siegmund et al. | 315—21 |

RODNEY D. BENNETT, Jr., Primary Examiner

JEFFREY P. MORRIS, Assistant Examiner

U.S. Cl. X.R.

315—18

UNITED STATES PATENT OFFICE
CERTIFICATE OF CORRECTION

Patent No. 3,497,758 Dated February 24, 1970

Inventor(s) CLAYTON A. WASHBURN

It is certified that error appears in the above-identified patent and that said Letters Patent are hereby corrected as shown below:

Column 5, line 43, "convering" should read -- converging --. Column 9, line 37, "perodicity" should read -- periodicity --; line 38, "perodicity" should read -- periodicity --; line 40, "455/8 = 567/8" should read -- 455/8 = 56-7/8 --. Column 12, line 19, "catthode-ray" should read -- cathode-ray --; line 70, "air" should read -- pair --. Column 15, line 64, "16-41" should read -- 16-42 --. Column 17, line 20, after "have" insert -- high --. Column 20, line 15, "to" should read -- onto --. Column 22, line 60, "cathode ray" should read -- cathode-ray --.

SIGNED AND SEALED
JUL 28 1970

(SEAL)
Attest:

Edward M. Fletcher, Jr.
Attesting Officer

WILLIAM E. SCHUYLER, JR.
Commissioner of Patents